United States Patent
Kurihara et al.

(10) Patent No.: US 10,309,412 B2
(45) Date of Patent: Jun. 4, 2019

(54) CENTRIFUGAL FAN, AIR-CONDITIONING APPARATUS, AND METHOD OF MANUFACTURING CENTRIFUGAL FAN

(71) Applicant: Mitsubishi Electric Corporation, Tokyo (JP)

(72) Inventors: Makoto Kurihara, Tokyo (JP); Kohei Tsunetomo, Tokyo (JP); Takehiro Hayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 632 days.

(21) Appl. No.: 14/889,963

(22) PCT Filed: Apr. 16, 2014

(86) PCT No.: PCT/JP2014/060774
§ 371 (c)(1),
(2) Date: Nov. 9, 2015

(87) PCT Pub. No.: WO2014/199719
PCT Pub. Date: Dec. 18, 2014

(65) Prior Publication Data
US 2016/0115967 A1    Apr. 28, 2016

(30) Foreign Application Priority Data
Jun. 14, 2013 (JP) ................. 2013-126039

(51) Int. Cl.
*F04D 29/28* (2006.01)
*F04D 29/02* (2006.01)
(Continued)

(52) U.S. Cl.
CPC ........ *F04D 29/281* (2013.01); *B29C 65/1635* (2013.01); *B29C 65/1654* (2013.01);
(Continued)

(58) Field of Classification Search
CPC .... F04D 29/281; F04D 29/624; F04D 29/626; F04D 29/30; F04D 29/023; F04D 25/08;
(Continued)

(56) References Cited

U.S. PATENT DOCUMENTS 3,819,437 A * 6/1974 Paine ..................... B29C 65/08
156/73.4
4,564,932 A * 1/1986 Lange ................... B29C 66/452
156/308.4
(Continued)

FOREIGN PATENT DOCUMENTS

DE    4446193 A1    6/1996
EP    2 006 075 A1    12/2008
(Continued)

OTHER PUBLICATIONS

JP,2010-236495, English Machine Translation, translated by J-PlatPat Mar. 22, 2018.*
(Continued)

*Primary Examiner* — Ninh H. Nguyen
*Assistant Examiner* — Wayne A Lambert
(74) *Attorney, Agent, or Firm* — Posz Law Group, PLC

(57) ABSTRACT

A centrifugal fan 1 includes a main plate 10, a shroud 20, and a plurality of blades 30 provided between the main plate 10 and the shroud 20. The blade 30 includes abutting surfaces 34, 35a, and 35b that respectively abut on abutted surfaces 12a, 22a, and another abutted surface formed on at least one of the main plate 10 and the shroud 20. The abutting surfaces 34, 35a, and 35b includes projections 36, 37a, and 37b formed thereon, respectively, and extending in a straight or curved line. The abutting surfaces 34, 35a, and 35b and the abutted surfaces 12a, 22a, and the other abutted surface are respectively welded to each other by laser beams 40 and 41
(Continued)

respectively directed onto and moved along the projection 36 and the projections 37a and 37b.

9 Claims, 10 Drawing Sheets

(51) Int. Cl.
| | |
|---|---|
| F04D 29/30 | (2006.01) |
| F04D 29/62 | (2006.01) |
| F24F 1/0022 | (2019.01) |
| B29C 65/16 | (2006.01) |
| B29C 65/00 | (2006.01) |
| F04D 25/08 | (2006.01) |
| B29L 31/08 | (2006.01) |

(52) U.S. Cl.
CPC ........ *B29C 65/1664* (2013.01); *B29C 66/124* (2013.01); *B29C 66/12469* (2013.01); *B29C 66/30223* (2013.01); *B29C 66/5346* (2013.01); *B29C 66/543* (2013.01); *F04D 25/08* (2013.01); *F04D 29/023* (2013.01); *F04D 29/30* (2013.01); *F04D 29/624* (2013.01); *F04D 29/626* (2013.01); *F24F 1/0022* (2013.01); *B29C 66/5344* (2013.01); *B29L 2031/08* (2013.01); *F05D 2230/234* (2013.01); *F05D 2260/96* (2013.01)

(58) Field of Classification Search
CPC ........... F05D 2260/96; F05D 2230/234; B29C 65/1635; B29C 65/1654; B29C 65/1664; B29C 66/543; B29C 66/5346; B29C 66/30223; B29C 66/12469; B29C 66/124; B29C 66/5344; B29L 2031/08; F24F 1/0022
See application file for complete search history.

(56) References Cited

U.S. PATENT DOCUMENTS

| | | | | |
|---|---|---|---|---|
| 4,618,516 A * | 10/1986 | Sager | ................ | B29C 37/0082 156/153 |
| 4,644,520 A * | 2/1987 | Lange | ................ | B29C 65/08 369/284 |
| 5,538,395 A * | 7/1996 | Hager | ................ | B29C 45/376 156/73.1 |
| 5,693,992 A * | 12/1997 | Kurusu | ................ | F04D 29/282 310/263 |
| 6,054,072 A * | 4/2000 | Bentley | ................ | B29C 65/1412 264/1.9 |
| 6,146,094 A | 11/2000 | Obana et al. | | |
| 6,805,531 B2 * | 10/2004 | Iida | ................ | B29C 45/0062 415/206 |
| 6,872,911 B2 | 3/2005 | Weiblen et al. | | |
| 6,964,717 B2 * | 11/2005 | Grosser | ................ | B29C 65/1635 156/272.8 |
| 6,974,207 B2 * | 12/2005 | Drummond | ................ | B29C 65/1635 347/49 |
| 8,007,240 B2 * | 8/2011 | Sanagi | ................ | F04D 29/282 29/889.4 |
| 8,293,060 B2 * | 10/2012 | Oonishi | ................ | B29C 65/7841 156/272.8 |
| 2002/0051707 A1 * | 5/2002 | Takahashi | ................ | B29C 45/0062 416/186 R |
| 2003/0132554 A1 * | 7/2003 | Grosser | ................ | B29C 65/1635 264/482 |
| 2004/0089641 A1 * | 5/2004 | Launais | ................ | B23K 26/0608 219/121.64 |
| 2004/0200569 A1 * | 10/2004 | Weiblen | ................ | B29C 65/1635 156/272.8 |
| 2005/0071998 A1 * | 4/2005 | Rocky | ................ | B29C 65/08 29/889 |
| 2005/0100703 A1 * | 5/2005 | Terada | ................ | B29C 65/1635 428/57 |
| 2005/0218123 A1 * | 10/2005 | Hayakawa | ................ | B29C 65/1635 219/121.64 |
| 2006/0068161 A1 * | 3/2006 | Enokida | ................ | B29C 65/06 428/119 |
| 2008/0205880 A1 | 8/2008 | Aoshima et al. | | |
| 2009/0047133 A1 | 2/2009 | Nishino | | |
| 2010/0170634 A1 | 7/2010 | Nishino | | |
| 2010/0242280 A1 * | 9/2010 | Adachi | ................ | B29C 65/08 29/889.7 |

FOREIGN PATENT DOCUMENTS

| | | |
|---|---|---|
| JP | 2007-239567 A | 9/2007 |
| JP | 2007-261076 A | 10/2007 |
| JP | 2008-075626 A | 4/2008 |
| JP | 2008-111393 A | 5/2008 |
| JP | 4432474 B2 | 3/2010 |
| JP | 2010-236495 A | 10/2010 |

OTHER PUBLICATIONS

Office Action dated Jan. 9, 2018 issued in corresponding JP patent application No. 2013-126039 (and English translation).
International Search Report of the International Searching Authority dated Jun. 24, 2014 for the corresponding international application No. PCT/JP2014/060774 (and English translation).
Chinese Office Action was dated Mar. 3, 2016 in the corresponding CN application No. 201410228892.0 (English translation attached).
Offfice Action dated May 10, 2016 issued in corresponding JP patent application No. 2013-126039 (and English translation).
Australian Office Action dated Jul. 15, 2016 in the corresponding Australian application No. 2014279400.
Extended European Search Report dated Feb. 6, 2017 issued in the corresponding European Patent Application No. 14 81 1463.0.
Office Action dated Sep. 26, 2016 issued in corresponding CN patent application No. 201410228892.0 (and English translation).
Office Action dated Apr. 10, 2017 issued in corresponding CN patent application No. 201410228892.0 (and English translation).
Office Action dated Oct. 24, 2017 issued in corresponding CN patent application No. 201410228892.0 (and English translation).
Office Action dated Feb. 15, 2019 issued in corresponding IN patent application No. 8057/CHENP/2015 (and English translation).
Office action dated Jan. 16, 2019 issued in corresponding MX application No. MX/A/2015/017140 (and English translation thereof).

* cited by examiner (a)  (b)

CENTRIFUGAL FAN, AIR-CONDITIONING APPARATUS, AND METHOD OF MANUFACTURING CENTRIFUGAL FAN

CROSS REFERENCE TO RELATED APPLICATION

This application is a U.S. national stage application of International Application No. PCT/JP2014/060774 filed on Apr. 16, 2014, and is based on Japanese Patent Application No. 2013-126039 filed on Jun. 14, 2013, the disclosures of which are incorporated herein by reference.

TECHNICAL FIELD

The present invention relates to a centrifugal fan, an air-conditioning apparatus, and a method of manufacturing a centrifugal fan.

BACKGROUND ART

A centrifugal fan includes a main plate rotatably driven by a fan motor, a shroud having an air inlet, and a plurality of blades provided between the main plate and the shroud. Conventionally, two-dimensional blades untwisted in a rotation axis direction have been mainly used as the blades of a centrifugal fan. Thus, the main plate and the blades have been integrally molded with resin. In recent years, however, it has become necessary to use three-dimensional blades having a shape twisted in a rotation axis direction for further reduction in the noise and power consumption of a centrifugal fan.

Patent Literature 1 describes an impeller of a centrifugal fan including a main plate made of resin, a plurality of hollow blades, and a side plate made of resin. Each of the hollow blades includes a resin first surface portion fixed to the main plate and a resin second surface portion attached to the first surface portion and forming a hollow space between the first surface portion and the second surface portion. With this impeller of a centrifugal fan, because the hollow blade includes the first surface portion and the second surface portion, the hollow structure of the blade is promoted to reduce the weight of the impeller even when the hollow blade is three-dimensional blade that extends in a twisted manner in an axis direction between the main plate and a side plate.

CITATION LIST

Patent Literature

Patent Literature 1: Japanese Patent No. 4432474

SUMMARY OF INVENTION

Technical Problem

The hollow blade in Patent Literature 1 is fixed to the side plate by laser beam welding. To fix a plurality of members to each other by laser beam welding with a stable welding strength, welding surfaces of the members have to be uniformly pressed to be brought into close contact during the laser beam welding. However, uniformly pressing welding surfaces to bring them into close contact to each other may be difficult, and thus a stable welding strength between the members cannot be achieved.

The present invention has been achieved for addressing the above problem to provide a centrifugal fan, an air-conditioning apparatus, and a method of manufacturing a centrifugal fan, enabling a stable welding strength between an abutting surface formed on a blade and an abutted surface formed on at least either a main plate or a shroud.

Solution to Problem

A centrifugal fan according to the present invention includes a main plate rotatably driven by a fan motor, a shroud facing the main plate, and a plurality of blades provided between the main plate and the shroud. The centrifugal fan is configured to suck gas in a direction of a rotation axis and blow out the gas in a direction intersecting the rotation axis. Each of the plurality of blades includes an abutting surface that abuts on an abutted surface formed on at least one of the main plate and the shroud. The abutting surface includes a projection formed thereon and extending in a straight or curved line. The abutting surface and the abutted surface are welded to each other by a laser beam directed onto and moved along the projection.

Advantageous Effects of Invention

According to the present invention, because the projection formed on the abutting surface and the abutted surface can be brought into close contact with a high surface pressure, a stable welding strength between the abutting surface and the abutted surface can be achieved by directing a laser beam onto the projection and moving the laser beam along the projection.

DESCRIPTION OF EMBODIMENTS

Embodiment 1

Figure 1:
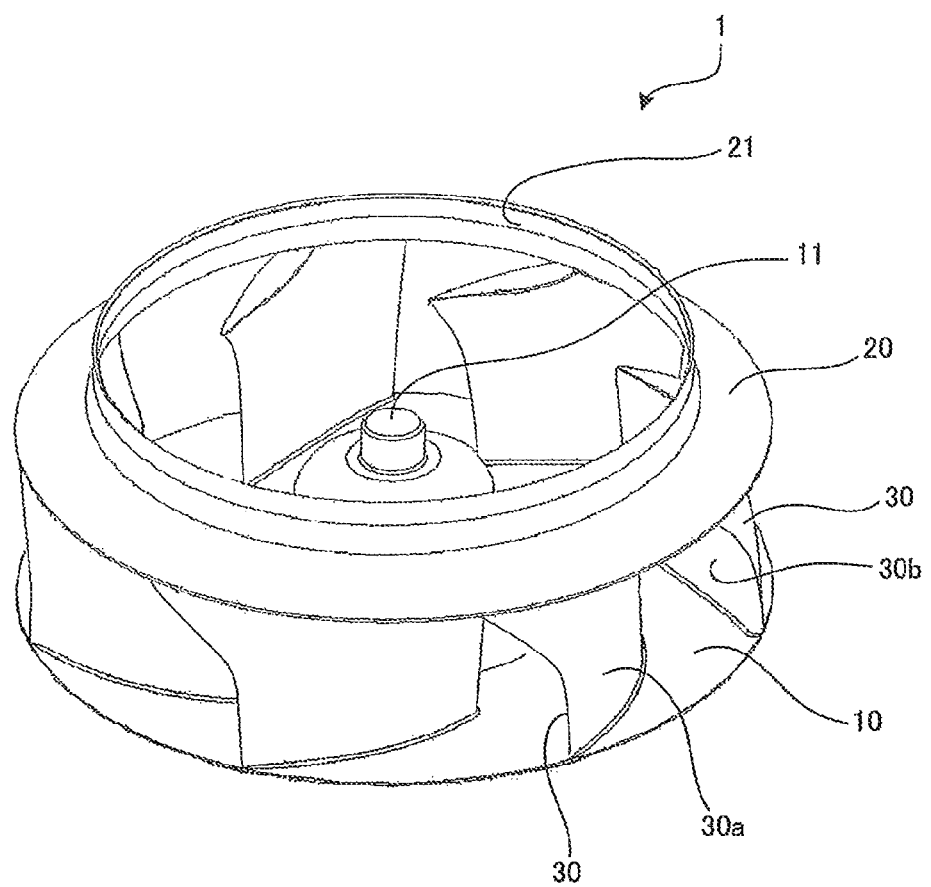
FIG. 1 is a perspective view schematically illustrating the configuration of a centrifugal fan 1 according to Embodiment 1 of the present invention.
Figure 2:
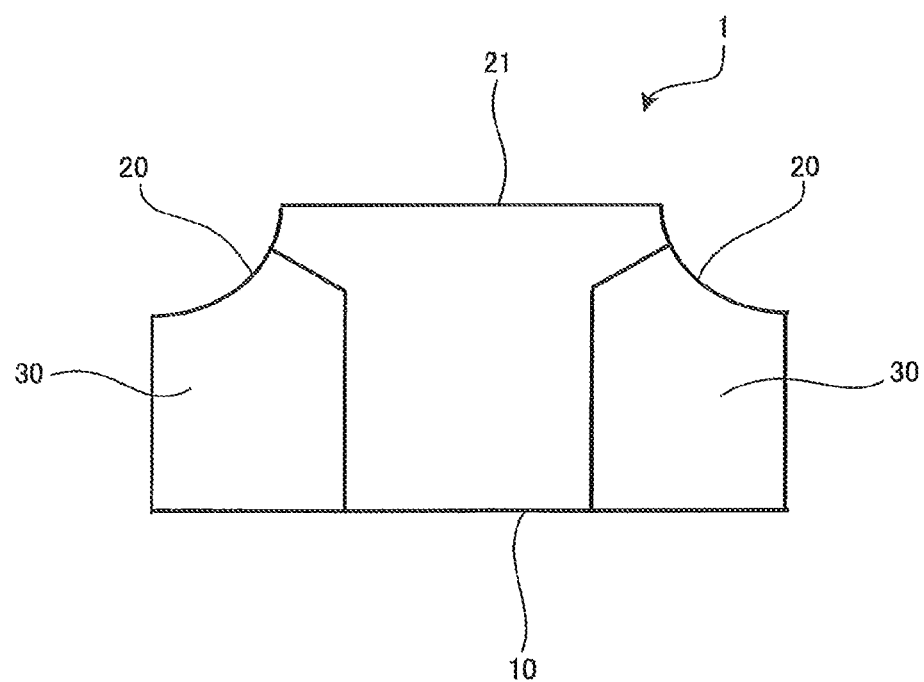
FIG. 2 is a pattern diagram schematically illustrating a cross-sectional configuration of the centrifugal fan 1 according to Embodiment 1 of the present invention obtained by cutting the centrifugal fan 1 in an axis direction.

A centrifugal fan according to Embodiment 1 of the present invention and a method of manufacturing the centrifugal fan are described below. FIG. 1 is a perspective view schematically illustrating the configuration of a centrifugal fan 1 according to the present embodiment. FIG. 2 is a pattern diagram schematically illustrating a cross-sectional configuration of the centrifugal fan 1 according to the present embodiment obtained by cutting the centrifugal fan 1 in an axis direction. In the accompanying drawings, including FIGS. 1 and 2, a dimensional relation between components or a shape of each component may not represent the actual dimensional relation or shape thereof.

As shown in FIGS. 1 and 2, the centrifugal fan 1 includes a main plate 10 rotatably driven by a fan motor 85 (see FIG. 11), a shroud 20 facing the main plate 10, and a plurality of (in this example, seven) blades 30 disposed between the main plate 10 and the shroud 20 and annularly arranged around a rotation axis. The centrifugal fan 1 sucks gas (such as air) in a rotation axis direction, and blows out the sucked gas in an outer circumferential direction intersecting the rotation axis.

The main plate 10 is made of a resin material having a relatively high transmittance of a laser beam and a relatively low absorbance of the laser beam (such as a transparent or white resin material). The main plate 10 has a substantial disk shape. A boss 11, which serves as a rotation axis of the centrifugal fan 1, is mounted on a central portion of the main plate 10. The boss 11 is fixed to an output shaft of the fan motor 85.

Similarly to the main plate 10, the shroud 20 is made of a resin material having a relatively high transmittance of a laser beam and a relatively low absorbance of the laser beam (such as a transparent or white resin material). The shroud 20 has an air inlet 21 at a central portion thereof for sucking gas from outside in the rotation axis direction. The shroud 20 is bell-shaped that gradually projects toward the side of air inlet 21 (opposite to the side of the main plate 10) from an outer circumferential portion thereof.

The blade 30 has a three-dimensional blade shape that is twisted between the main plate 10 and the shroud 20 for reducing noise and power consumption. Because the blade 30, having a three-dimensional blade shape, is difficult to be integrally molded with the main plate 10 or the shroud 20, the blade 30 is made separately from the main plate 10 and the shroud 20. The blade 30 is made of a resin material having a transmittance of a laser beam that is lower than that of the resin material of the main plate 10 and the shroud 20, and a absorbance of the laser beam that is higher than that of the resin material of the main plate 10 and the shroud 20 (such as a black resin material). Thus, the positions between the blade 30 and the main plate 10 and between the blade 30 and the shroud 20 can be welded by directing the laser beam from the side of the main plate 10 and the side of the shroud 20. A bottom end of the blade 30 is fixed to the main plate 10 by laser beam welding, and a top end of the blade 30 is fixed to the shroud 20 by laser beam welding. The blade 30 has a pressure surface 30a, which is a blade surface far from the rotation axis, and a suction surface 30b, which is a blade surface close to the rotation axis.

As a material of each component of the centrifugal fan 1, a thermoplastic resin material is used because it is easily molded, light, and cost-effective. Also, to achieve a complex three-dimensional blade shape, the blade 30 is composed of a plurality of parts. Consequently, the shape of the blade 30 is less restricted by a mold structure (such as a restriction due to a demolding direction) and thus a hollow structure can be created inside the blade 30, realizing the weight reduction of the blade 30.

Figure 3:
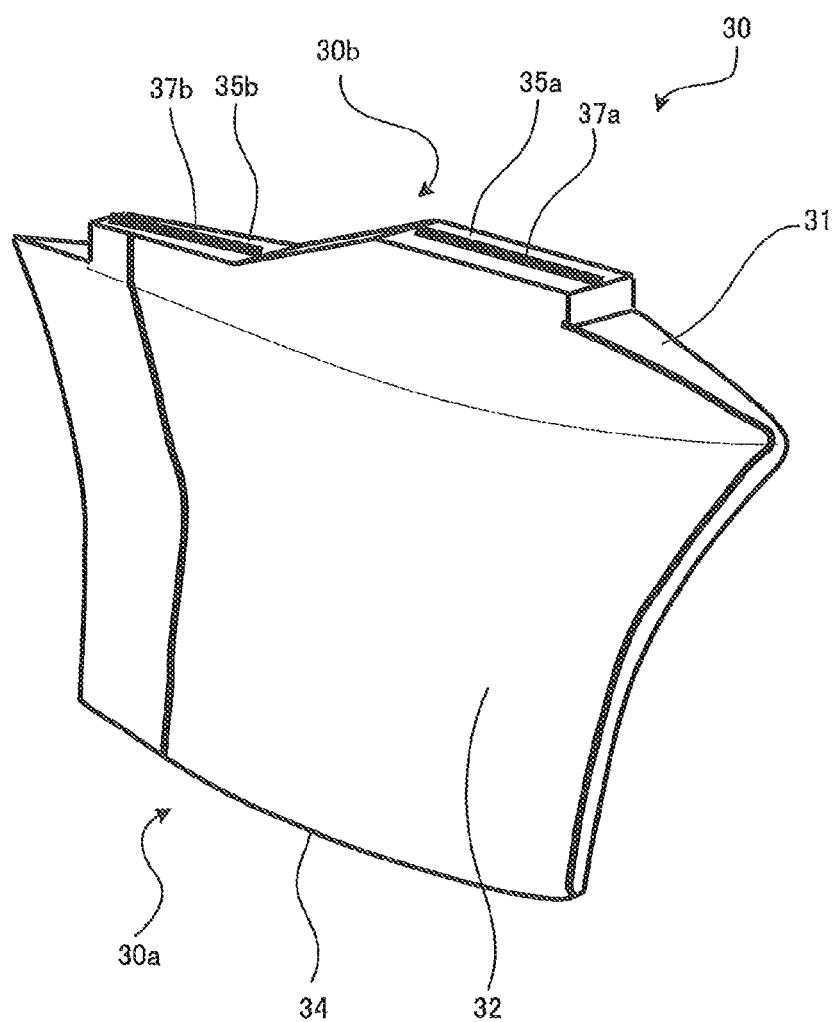
FIG. 3 is a perspective view schematically illustrating the configuration of a blade 30 of the centrifugal fan 1 according to Embodiment 1 of the present invention.
Figure 4:
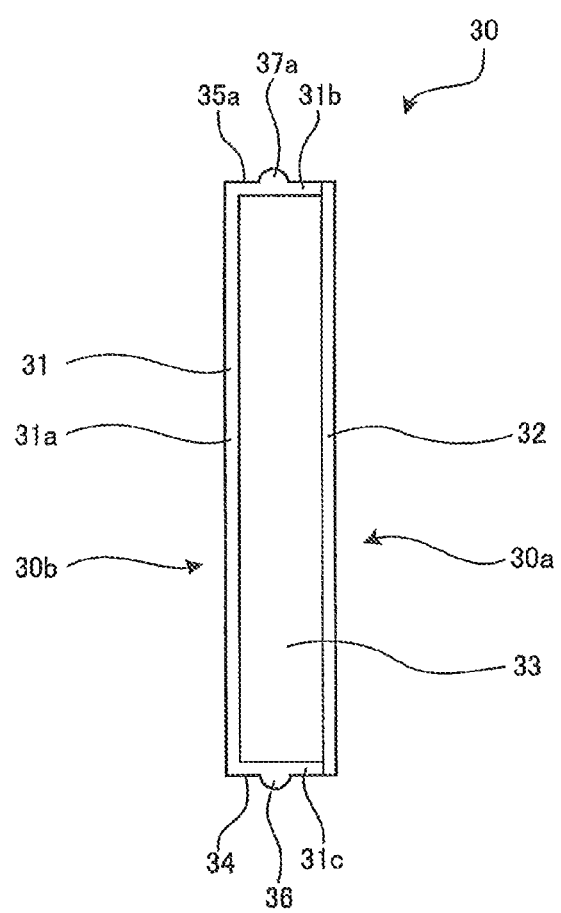
FIG. 4 is a cross-sectional view schematically illustrating a cross-sectional configuration of the blade 30 of the centrifugal fan 1 according to Embodiment 1 of the present invention.

FIG. 3 is a perspective view illustrating the configuration of the blade 30 as seen from the side of the pressure surface 30a. FIG. 4 is a cross-sectional view schematically illustrating a cross-sectional configuration of the blade 30 obtained by cutting the blade 30 with a plane parallel to the rotation axis. Although FIG. 4 as well as FIGS. 5 to 8 described below illustrate the cross section in a simple rectangular shape so that the structure of the blade 30 can be easily understood, the blade 30 actually has a complex three-dimensional blade shape. Thus, the rectangular cross sections illustrated in FIG. 4 and other drawings may not actually exist. As shown in FIGS. 3 and 4, the blade 30 has a plurality of parts combined together. The parts include a main blade 31 (one example of a second member) forming the whole of the suction surface 30b and a part of the pressure surface 30a (in this example, a part of the pressure surface 30a on the side of a trailing edge of the blade 30) and a blade cover 32 (one example of a first member) forming the rest of the pressure surface 30a.

The blade cover 32 has a twisted curved plate shape (FIG. 4 illustrates the blade cover 32 in a flat plate shape). The main blade 31 faces the blade cover 32, and forms the whole of the suction surface 30b. The main blade 31 includes a surface portion 31a having a twisted curved plate shape (FIG. 4 illustrates the surface portion 31a in a flat plate shape) and a peripheral edge extending from an end of the surface portion 31a toward an end of the blade cover 32 (FIG. 4 illustrates an upper edge portion 31b and a lower edge portion 31c as a part of the peripheral edge). A hollow space 33 is formed between the main blade 31 and the blade cover 32.

An abutting surface 34, which substantially abuts on an abutted surface 12a (see FIG. 5 and other drawings described below) formed on the main plate 10, is formed on at least a part of a lower surface of the lower edge portion 31c. The abutting surface 34 in this example is formed and extends over the lower surface of the lower edge portion 31c and a lower end surface of the blade cover 32. The abutting surface 34 has a shape that is elongated in one direction along a longitudinal direction of the lower edge portion 31c. The blade 30 and the main plate 10 abut on each other with the abutting surface 34 and the abutted surface 12a. The abutting surface 34 and the abutted surface 12a serve as welding surfaces for welding and fixing the blade 30 and the main plate 10 to each other.

Figure 5:
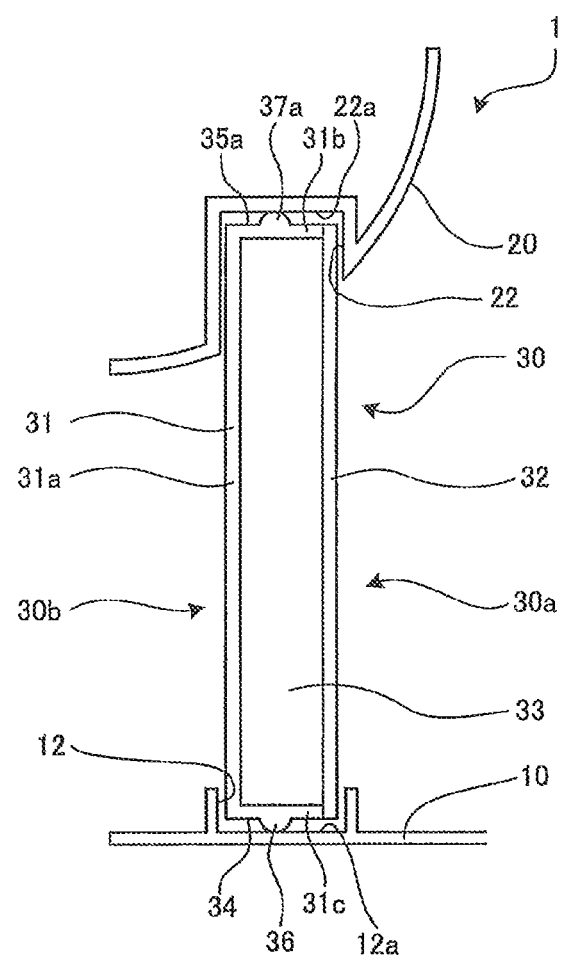
FIG. 5 is a diagram for describing an assembly creating step, which is a part of a manufacturing process of the centrifugal fan 1 according to Embodiment 1 of the present invention.

At least a part of an upper surface of the upper edge portion 31b includes abutting surfaces 35a and 35b formed thereon that substantially and respectively abut on two abutted surfaces, which are an abutted surface 22a and another abutted surface, formed on the shroud 20 (see FIG. 5 and other drawings described below. Of the two abutted surfaces, only an abutted surface 22a is illustrated in FIG. 5 and other drawings and the other abutted surface is omitted). Each of the abutting surfaces 35a and 35b of this example is formed and extends over the upper surface of the upper edge portion 31b and an upper end surface of the blade cover 32. Each of the abutting surfaces 35a and 35b has a shape that is elongated in one direction along a longitudinal direction of the upper edge portion 31b. The blade 30 and the shroud 20 abut on each other with the abutting surfaces 35a and 35b and the two abutted surfaces, which are the abutted surface 22a and the other abutted surface, of the shroud 20. The abutting surfaces 35a and 35b and the abutted surface 22a and the other abutted surface serve as welding surfaces for welding and fixing the blade 30 and the shroud 20 to each other. In this example, the abutting surfaces 35a and 35b having different heights are unevenly formed on the upper edge portion 31b of the blade 30 (main blade 31), and the abutted surface 22a and the other abutted surface being abutted by the abutting surfaces 35a and 35b, respectively, also are unevenly formed on the side of the shroud 20.

The abutting surface 34 includes a linear projection 36 formed thereon and extending in a straight or curved line (a substantially straight line in this example) along a longitudinal direction of the abutting surface 34. The projection 36 is formed in the vicinity of a central portion of the abutting surface 34 in an extending direction of the lower edge portion 31c (a short direction, or a horizontal direction in FIG. 4). The projection 36 has an arcuate (in this example, a semicircular) cross-section. The abutting surface 34 of the blade 30 and the abutted surface 12a of the main plate 10 are welded to each other by a laser beam that is directed onto and moved along the projection 36.

Similarly, the abutting surfaces 35a and 35b respectively include linear projections 37a and 37b formed thereon and each extending in a straight or curved line (a substantially straight line in this example) along a longitudinal direction of the abutting surface 35a or 35b. The projections 37a and 37b are respectively formed in the vicinity of a central portion of the abutting surfaces 35a and 35b in an extending direction of the upper edge portion 31b (a short direction, or a horizontal direction in FIG. 4). The projections 37a and 37b have an arcuate (in this example, a semicircular) cross-section. The abutting surface 35a of the blade 30 and the abutted surface 22a of the shroud 20 are welded to each other by a laser beam that is directed onto and moved along the projection 37a. Also, the abutting surface 35b of the blade 30 and the corresponding abutted surface of the shroud 20 are welded to each other by a laser beam that is directed onto and moved along the projection 37b.

A method of manufacturing the centrifugal fan 1 according to the present embodiment is described below.

In the process of manufacturing the centrifugal fan 1, firstly, the main plate 10, the shroud 20, the main blade 31 and the blade cover 32 of the blade 30, and other parts are molded by mold injection or the like using a thermoplastic resin (parts molding step). At this stage, the projection 36 having an arcuate cross-sectional shape is formed on the lower surface of the lower edge portion 31c, which is a part of the abutting surface 34, of the main blade 31, and the projections 37a and 37b each having an arcuate cross-sectional shape are formed on the upper surface of the upper edge portion 31b, which is a part of the abutting surfaces 35a and 35b, of the main blade 31. The main plate 10 and the shroud 20 are made of a thermoplastic resin having a high transmittance of a laser beam, and the main blade 31 and the blade cover 32 of the blade 30 are made of a thermoplastic resin having a high absorbance of a laser beam.

Next, the main blade 31 and the blade cover 32 are joined together to create the blade 30 (blade creating step). The main blade 31 and the blade cover 32 may be fixed to each other by fitting only, or may be adhesively fixed to each other with an adhesive or the like as needed. After the blade 30 is created, the linear projection 36 is formed on the lower edge portion 31c (abutting surface 34) and extends in a straight or curved line along the longitudinal direction of the abutting surface 34. Also, the linear projections 37a and 37b are formed on the upper edge portion 31b (abutting surfaces 35a and 35b) of the blade 30 and each extend in a straight or curved line along the longitudinal direction of the abutting surface 35a or 35b.

Next, the blades 30 that have been created are joined with the main plate 10 and the shroud 20 to create an assembly of the centrifugal fan 1 (assembly creating step). FIG. 5 is a diagram for describing the assembly creating step. As shown in FIG. 5, a concave portion 12, into which the lower edge portion 31c of the blade 30 is fit, is formed on an upper surface of the main plate 10. The concave portion 12 includes the abutted surface 12a, on which the abutting surface 34 of the blade 30 abuts, formed at a bottom surface thereof. Also, a concave portion 22, into which the upper edge portion 31b of the blade 30 is fit, is formed on a lower surface of the shroud 20. The concave portion 22 includes the abutted surface 22a, on which the abutting surface 35a of the blade 30 abuts, formed at a bottom surface thereof. Although not shown in the drawings, the concave portion 22 also includes the abutted surface, on which the abutting surface 35b of the blade 30 abuts and which has a different height than the abutted surface 22a, formed at the bottom surface thereof. In the assembly creating step, the lower edge portion 31c of the blade 30 is fit into the concave portion 12 of the main plate 10, and the upper edge portion 31b of the blade 30 is fit into the concave portion 22 of the shroud 20. Thus, the projection 36 formed on the abutting surface 34 of the blade 30 is abutted on the abutted surface 12a of the main plate 10, the projection 37a formed on the abutting surface 35a of the blade 30 is abutted on the abutted surface 22a of the shroud 20, and the projection 37b formed on the abutting surface 35b of the blade 30 is abutted on the corresponding abutted surface of the shroud 20. In this assembly creating step, the main plate 10, the shroud 20, and a plurality of the blades 30 are positioned relative to each other.

Figure 6:
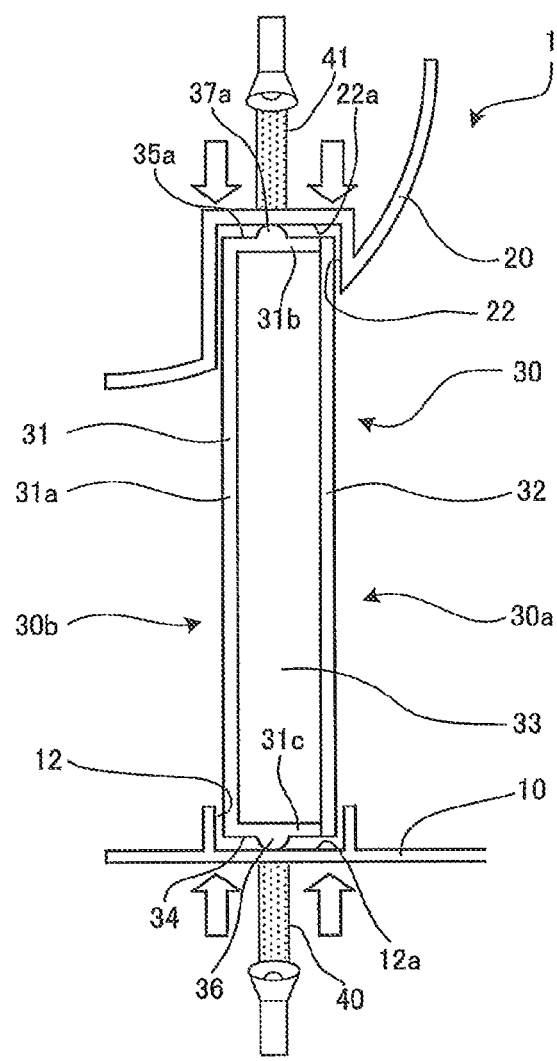
FIG. 6 is a diagram for describing a laser beam welding step, which is a part of the manufacturing process of the centrifugal fan 1 according to Embodiment 1 of the present invention.
Figure 7:
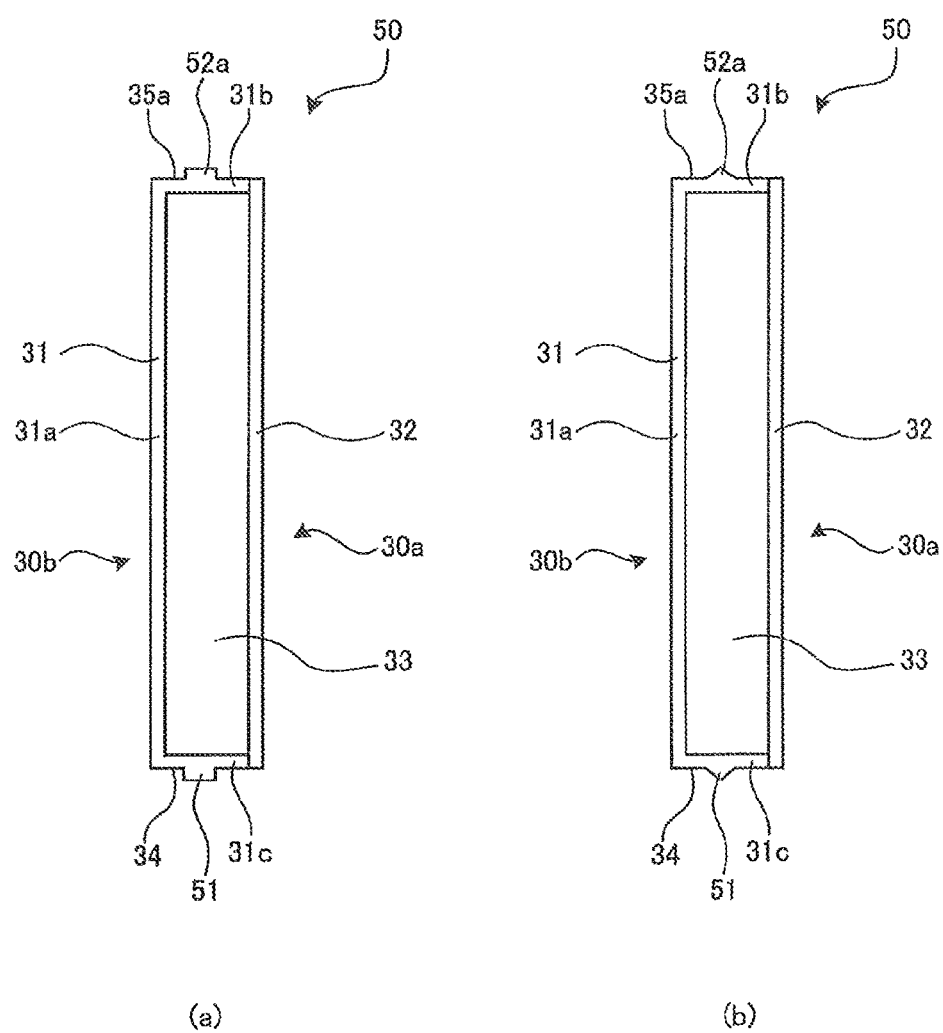
FIG. 7 is cross-sectional views schematically illustrating cross-sectional configurations of a blade 50 of a centrifugal fan according to Embodiment 2 of the present invention.

Next, laser beam welding of the assembly of the centrifugal fan 1 is performed (laser beam welding step). In the laser beam welding step, the abutting surface 34 of the blade 30 and the abutted surface 12a of the main plate 10, the abutting surface 35a of the blade 30 and the abutted surface 22a of the shroud 20, and the abutting surface 35b of the blade 30 and the corresponding abutted surface of the shroud 20 are respectively welded to each other in a sequential or simultaneous manner. FIG. 6 is a diagram for describing the laser beam welding step. As shown in FIG. 6, when laser beam welding is performed in the laser beam welding step, the main plate 10 and the shroud 20 are pressed in mutually facing directions with the blade 30 positioned therebetween (the wide arrows in FIG. 6 illustrate the directions of the pressing). This pressurization makes the blade 30 and the main plate 10, and the blade 30 and the shroud 20 respectively adhered to each other.

At this stage, because the contact between the blade 30 and the main plate 10 is substantially limited to a tip of the projection 36, the projection 36 and the abutted surface 12a of the main plate 10 are in close contact with each other with a high surface pressure. While this state is maintained, a laser beam 40 is directed onto the projection 36 from the side of the main plate 10 through the abutted surface 12a and is moved along the projection 36. Thus, the projection 36 and its periphery of the abutting surface 34 of the blade 30 are heated and melted, and the abutting surface 34 of the blade 30 and the abutted surface 12a of the main plate 10 are welded to each other. In this example, because the projection 36 and the abutted surface 12a are in close contact with each other with a high surface pressure in an area onto which the laser beam 40 is directed, the adhesiveness between the welding surfaces is increased and a stable welding strength can thus be achieved between the abutting surface 34 of the blade 30 and the abutted surface 12a of the main plate 10.

Similarly, because the contact between blade 30 and the shroud 20 is substantially limited to tips of the projections 37a and 37b, the projections 37a and 37b and the abutted surfaces (the abutted surface 22a and the abutted surface corresponding to the projection 37b) of the shroud 20 are in close contact with each other with a high surface pressure. While this state is maintained, a laser beam 41 is directed onto the projections 37a and 37b from the side of the shroud 20 through the abutted surface 22a and the other abutted surface and is moved along the projections 37a and 37b, respectively. Thus, the projection 37a and its periphery of the abutting surface 35a of the blade 30 are heated and melted, and the abutting surface 35a of the blade 30 and the abutted surface 22a of the shroud 20 are welded to each other. Also, the projection 37b and its periphery of the abutting surface 35b of the blade 30 are heated and melted, and the abutting surface 35b of the blade 30 and the corresponding abutted surface of the shroud 20 are welded to each other. In this example, because the projections 37a and 37b and the abutted surface 22a and the other abutted surface of the shroud 20 are in close contact with each other with a high surface pressure in an area onto which the laser beam 41 is directed, the adhesiveness between the welding surfaces is increased and a stable welding strength can thus be achieved between the abutting surfaces 35a and 35b of the blade 30 and the abutted surface 22a and the other abutted surface of the shroud 20.

As described above, the centrifugal fan 1 according to the present embodiment includes the main plate 10 rotatably driven by the fan motor 85, the shroud 20 facing the main plate 10, and a plurality of the blades 30 provided between the main plate 10 and the shroud 20. The centrifugal fan 1 is configured to suck gas in a direction of a rotation axis and blow out the gas in a direction intersecting the rotation axis. The blade 30 includes the abutting surfaces 34, 35a, and 35b that abut on the abutted surfaces 12a, 22a, and the other abutted surface formed on at least one of the main plate 10 and the shroud 20. The abutting surfaces 34, 35a and 35b respectively include the projections 36, 37a, and 37b formed thereon and extending in a straight or curved line. The abutting surfaces 34, 35a, and 35b and the abutted surfaces 12a, 22a, and the other abutted surface are respectively welded to each other by the laser beams 40 and 41 respectively directed onto and moved along the projection 36 and the projections 37a and 37b.

Also, the method of manufacturing the centrifugal fan 1 according to the present embodiment is the method of manufacturing a centrifugal fan that includes the main plate 10 rotatably driven by the fan motor 85, the shroud 20 facing the main plate 10, and a plurality of the blades 30 provided between the main plate 10 and the shroud 20. The centrifugal fan sucks gas in a direction of a rotation axis and blows out the gas in a direction intersecting the rotation axis. The method includes the steps of forming the projections 36, 37a and 37b extending in a straight or curved line on the abutting surfaces 34, 35a, and 35b, respectively, formed on the blade 30 for abutting on the abutted surfaces 12a, 22a, and the other abutted surface formed on at least either the main plate 10 or the shroud 20, placing the projections 36, 37a, and 37b formed on the abutting surfaces 34, 35a, and 35b in abutment with the abutted surfaces 12a, 22a, and the other abutted surface, respectively, and welding the abutting surfaces 34, 35a, and 35b and the abutted surfaces 12a, 22a, and the other abutted surface to each other by directing the laser beams 40 and 41 onto the projection 36 and the projections 37a and 37b, respectively, and moving the laser beams 40 and 41 along the projection 36 and the projections 37a and 37b, respectively.

Generally, when members are to be laser-welded to each other when one or both of welding surfaces of the members has a poor flatness due to resin molding or when the welding surfaces are unevenly pressed toward each other, the welding surfaces of the members may be brought into close contact at a region onto which a laser beam is not directed, causing a poor contact at a region onto which the laser beam is directed. An insufficient contact of welding surfaces of members at a region onto which a laser beam is directed is a major reason that hinders the welding between the welding surfaces.

Also, usually, when the blade 30 has a two-dimensional blade shape, the abutting surfaces 35a and 35b formed on the upper edge portion 31b and the abutting surface 34 formed on the lower edge portion 31c are commonly aligned with a straight line that is parallel to a direction of the pressing. Thus, when the main plate 10 and the shroud 20 are pressed toward each other with the blade 30 positioned therebetween, the line of action of a force acting on the side of the upper edge portion 31b of the blade 30 and the line of action of a force acting on the side of the lower edge portion 31c of the blade 30 can be aligned with a straight line. When the blade 30 has a three-dimensional blade shape, on the other hand, the abutting surfaces 35a and 35b and the abutting surface 34 are often not aligned with the direction of the pressing. Thus, when the main plate 10 and the shroud 20 are pressed toward each other with the blade 30 positioned therebetween, it may be difficult to align the line of action of the force acting on the side of the upper edge portion 31b of the blade 30 and the line of action of the force acting on the side of the lower edge portion 31c of the blade 30 on a straight line. If these lines of actions are not aligned on a straight line and the main plate 10 and the shroud 20 are pressed toward each other with a high pressing force, a turning force may act on the blade 30. Thus, due to the difficulty of evenly pressing welding surfaces of members, particularly when the blade 30 has a three-dimensional blade shape, it has been difficult to achieve a stable welding strength between the welding surfaces.

In the present embodiment, on the other hand, because the projections 36, 37a, and 37b are respectively provided on the abutting surfaces 34, 35a, and 35b of the blade 30, a position of contact between the welding surfaces (that is, between the abutting surface 34 and the abutted surface 12a, between the abutting surface 35a and the abutted surface 22a, and between the abutting surface 35b and the corresponding abutted surface) by the pressing is substantially limited to the projections 36, 37a, and 37b. Therefore, because the contact area between the welding surfaces can be small, the welding surfaces can be brought into close contact with each other with a high surface pressure even when the main plate 10 and the shroud 20 are pressed with a relatively weak pressing force. Also, a position of contact between the welding surfaces can be fixed on the projections 36, 37a, and 37b. Thus, a stable welding strength between the welding surfaces can be achieved by directing the laser beams 40 and 41 onto the projection 36 and the projections 37a and 37b, respectively, and moving the laser beams 40 and 41 along the projection 36 and projections 37a and 37b, respectively. Thus, a stable, strong welding between the welding surfaces can be achieved even when the welding surfaces are difficult to be evenly pressed to be brought into close contact (such as when the blade 30 having a three-dimensional blade shape is used). Therefore, according to the present embodiment, the blade 30 having a three-dimensional blade shape can be used to create the centrifugal fan 1 that operates with low noise and small power consumption, and moreover the highly strong centrifugal fan 1 can be created that the welding surfaces are stably and rigidly welded to each other.

Also, in the present embodiment, each of the projections 36, 37a, and 37b has an arcuate cross-sectional shape. With this configuration, a contact area between the projections 36, 37a, and 37b and the abutted surfaces 12a, 22a, and the other abutted surface, respectively, can be made substantially constant even when the abutting surfaces 34, 35a, and 35b and the abutted surfaces 12a, 22a, and the other abutted surface are slightly inclined with respect to each other in a direction other than the directions in which the projections 36, 37a, and 37b extend. Therefore, the projections 36, 37a, and 37b and the abutted surfaces 12a, 22a, and the other abutted surface can be pressed toward each other with a substantially constant surface pressure and the welding surfaces can be welded with a constant welding strength.

Embodiment 2

A centrifugal fan according to Embodiment 2 of the present invention is described below. FIGS. 7(a) and 7(b) are cross-sectional views schematically illustrating cross-sectional configurations of a blade 50 of the centrifugal fan according to the present embodiment, and correspond to FIG. 4 of Embodiment 1. Compared with Embodiment 1, the present embodiment is characterized in that projections 51, 52a, and another projection have different cross-sectional shapes. In the following description, elements that have the same function and effect as those of the blade 30 of Embodiment 1 are represented with the same reference signs for avoiding duplication of description.

In the configuration illustrated in FIG. 7(a), the projection 51 formed on the abutting surface 34 of the blade 50 and the projection 52a formed on the abutting surface 35a of the blade 50 each have a quadrangular cross-sectional shape (in this example, a horizontally long rectangular cross-sectional shape). Although not shown in the drawings, the projection formed on the abutting surface 35b (see FIG. 3) also has a quadrangular cross-sectional shape as with the projections 51 and 52a.

Also, in the configuration illustrated in FIG. 7(b), the projections 51 and 52a each have a triangular cross-sectional shape (in this example, an isosceles triangular cross-sectional shape having an obtuse apex angle). Although not shown in the drawings, the projection formed on the abutting surface 35b also has a triangular cross-sectional shape as with the projections 51 and 52a.

According to the present embodiment, substantially the same effects as Embodiment 1 can be achieved. Also, in the present embodiment, an optical shape of the projections 51, 52a, and the other projection can be chosen in accordance with a shape of a welding surface, a diameter of a laser beam (spot diameter), and a jig used for pressing welding surfaces toward each other, for example.

Embodiment 3

Figure 8:
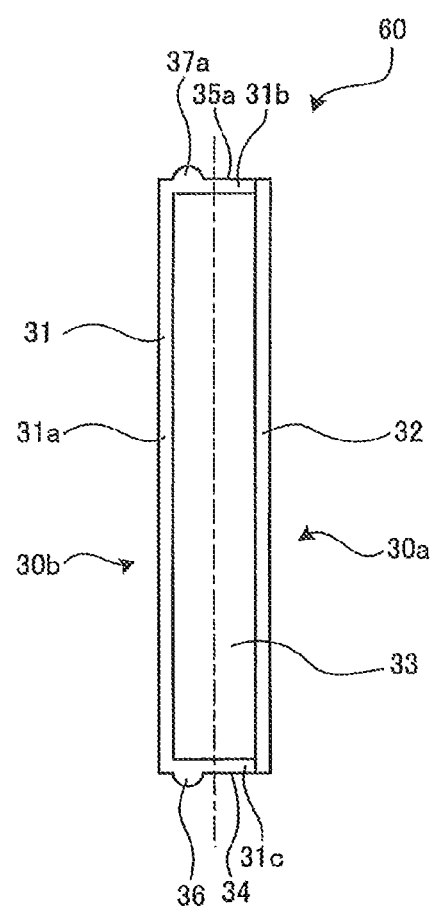
FIG. 8 is a cross-sectional view schematically illustrating a cross-sectional configuration of a blade 60 of a centrifugal fan according to Embodiment 3 of the present invention.

A centrifugal fan according to Embodiment 3 of the present invention is described below. FIG. 8 is a cross-sectional view schematically illustrating a cross-sectional configuration of a blade 60 of the centrifugal fan according to the present embodiment, and corresponds to FIG. 4 of Embodiment 1. Compared with Embodiment 1, the present embodiment is characterized in the position of the projections 36, 37a, and the other projection. In the following description, elements that have the same function and effect as those of the blade 30 of Embodiment 1 are represented with the same reference signs for avoiding duplication of description.

As shown in FIG. 8, in the present embodiment, the projection 36 on the abutting surface 34 of the blade 60 is formed closer to the surface portion 31a (that is, closer to the corner formed by the surface portion 31a and the lower edge portion 31c) than a central portion of the abutting surface 34 in an extending direction of the lower edge portion 31c (a short direction, or the horizontal direction in FIG. 8). For example, the whole of the projection 36 is positioned in a region that is closer to the surface portion 31a than the central portion of the abutting surface 34. Also, the projection 37a on the abutting surface 35a of the blade 60 is formed closer to the surface portion 31a (that is, closer to the corner formed by the surface portion 31a and the upper edge portion 31b) than a central portion of the abutting surface 35a in an extending direction of the upper edge portion 31b (a short direction, or the horizontal direction in FIG. 8). For example, the whole of the projection 37a is positioned in a region that is closer to the surface portion 31a than the central portion of the abutting surface 35a. Although not shown in the drawings, the projection 37b on the abutting surface 35b (see FIG. 3) of the blade 60 is also formed closer to the surface portion 31a than the central portion of the abutting surface 35b in the extending direction of the upper edge portion 31b. That is, the projections 36, 37a, and 37b are respectively arranged at a position that is closer to the side opposite to the blade cover 32 (side opposite to the blade cover) than the central portion of the abutting surface 34, 35a, and 35b.

As described above, the centrifugal fan according to the present embodiment is characterized in that the blade 30 includes the blade cover 32 (one example of the first member) constituting at least a part of one blade surface of the blade 30 (in this example, the pressure surface 30a) and the main blade 31 (one example of the second member) having the surface portion 31a facing the blade cover 32 and constituting at least a part of the other blade surface of the blade 30 (in this example, the suction surface 30b), and the upper and lower edge portions 31b and 31c (an example of a peripheral edge) extending from ends of the surface portion 31a to ends of the first member. The main blade 31 forms the hollow space 33 between the main blade 31 and the blade cover 32. The abutting surfaces 34, 35a and 35b are formed on the upper and lower edge portions 31b and 31c, and the projections 36, 37a and 37b are formed closer to the surface portion 31a (side opposite to the blade cover) than the central portion of the abutting surfaces 34, 35a and 35b in the extending direction of the upper edge portion 31b and the lower edge portion 31c.

According to this configuration, due to the arrangement of the projections 36, 37a and 37b close to the side opposite to the blade cover, forces can be easily applied to the projections 36, 37a, and 37b bidirectionally in a vertical direction while laser beam welding is performed. Consequently, the adhesiveness is increased between welding surfaces during the laser beam welding, and thus the welding strength is increased between the blade 60 and the main plate 10 and between the blade 60 and the shroud 20.

Figure 9:
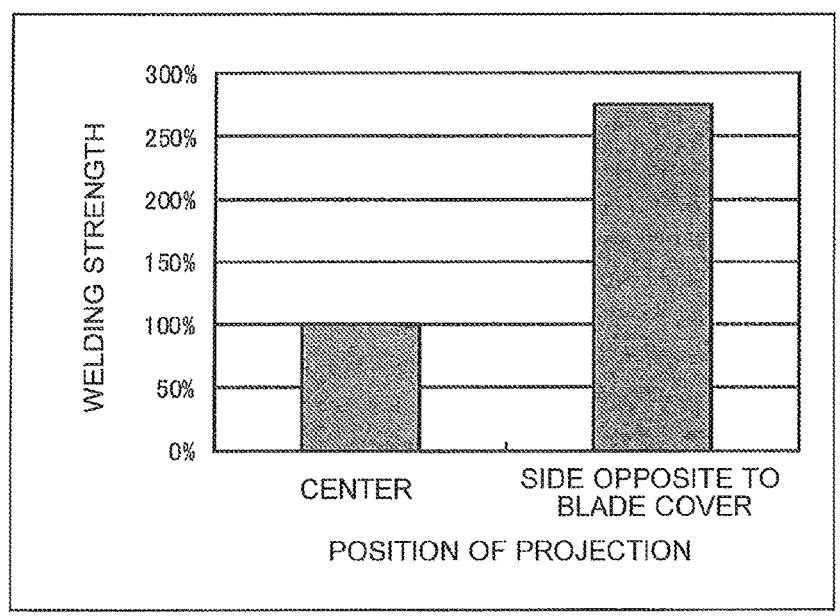
FIG. 9 is a chart illustrating the relation between the position and the welding strength of projections 36, 37a, and 37b of the centrifugal fan according to Embodiment 3 of the present invention.

Here, two types of blades are created that have the same configuration except the position of the projections 36, 37a, and 37b (whether they are positioned at the central portion or a portion close to the side opposite to the blade cover on the abutting surfaces 34, 35a, and 35b), and each type of the blades is joined with the main plate 10 and the shroud 20 to create two types of assemblies. Using each assembly, laser beam welding of the welding surfaces is performed while the main plate 10 and the shroud 20 are pressed with the same load, and the welding strength is assessed between each blade and the main plate 10 and between each blade and the shroud 20. FIG. 9 is a chart illustrating the relation between the position of the projections 36, 37a, and 37b and the welding strength. As shown in FIG. 9, the welding strength of the configuration in which the projections 36, 37a, and 37b are arranged close to the side opposite to the blade cover is approximately three times higher than that of the configuration in which the projections 36, 37a, and 37b are arranged in the central portion.

Embodiment 4

A centrifugal fan according to Embodiment 4 of the present invention is described below. The present embodiment is characterized in that the width of the projections 36, 37a, 37b, 51, 52a, and the other projection in Embodiments 1 and 2 is optimized. In connection with this example, five types of blades are created that have the same configuration except the width of the projections 36, 37a, and 37b having an arcuate cross-sectional shape, and each type of the blade is joined with the main plate 10 and the shroud 20 to create five types of assemblies. The width of the projections 36, 37a, and 37b of these blades is adjusted to 25%, 50%, 100%, 150%, and 175% of a laser diameter (spot diameter of a laser beam). Using each assembly, laser beam welding of the welding surfaces is performed while the main plate 10 and the shroud 20 are pressed with the same load, and the welding strength is assessed between each blade and the main plate 10 and between each blade and the shroud 20.

Figure 10:
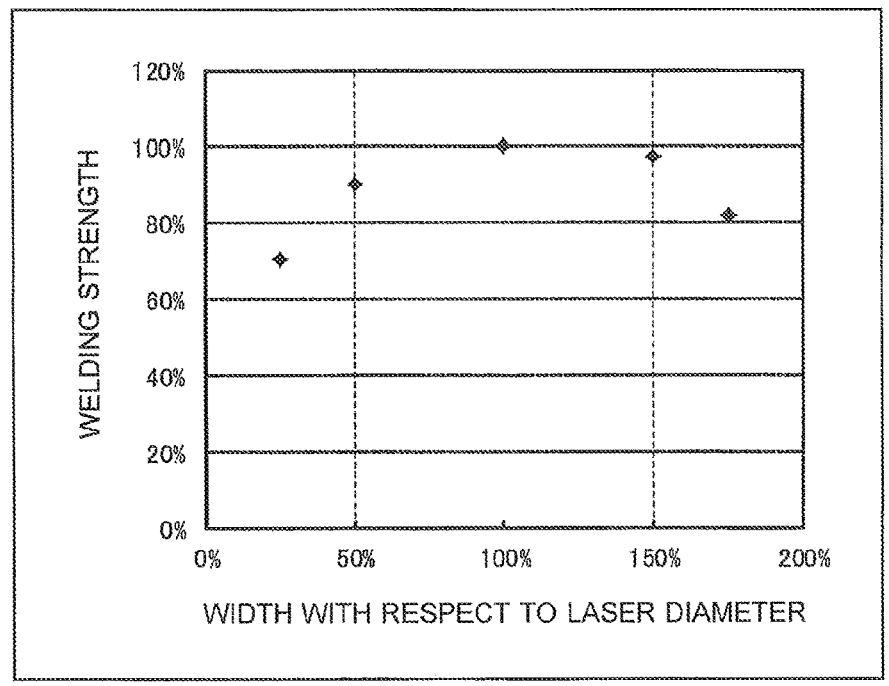
FIG. 10 is a chart illustrating the relation between the width and the welding strength of the projections 36, 37a, and 37b of a centrifugal fan according to Embodiment 4 of the present invention.

FIG. 10 is a chart illustrating the relation between the width of the projections 36, 37a, and 37b and the welding strength. As shown in FIG. 10, the maximum welding strength can be achieved when the width of the projections 36, 37a, and 37b is 100% of the laser diameter. Also, when the width of the projections 36, 37a, and 37b is less than 50% of the laser diameter, the welding strength reduces (to less than 90% of the maximum welding strength) because the effect of the projections 36, 37a, and 37b decreases. On the other hand, when the width of the projections 36, 37a, and 37b is larger than 150% of the laser diameter, the welding strength also reduces (to less than 90% of the maximum welding strength) because the projections 36, 37a, and 37b gradually become flattened and thus the effect of the projections 36, 37a, and 37b decreases. The similar tendency of the relation between the width of the projections and the welding strength can be also observed when the cross-sectional shape of the projections is changed from an arcuate shape to a quadrangular or triangular shape. Thus, the width of the projections 36, 37a, 37b, 51, 52a, and the other projection is preferably between 50% and 150% of the laser diameter, and is most preferably 100% of the laser diameter.

Embodiment 5

Figure 11:
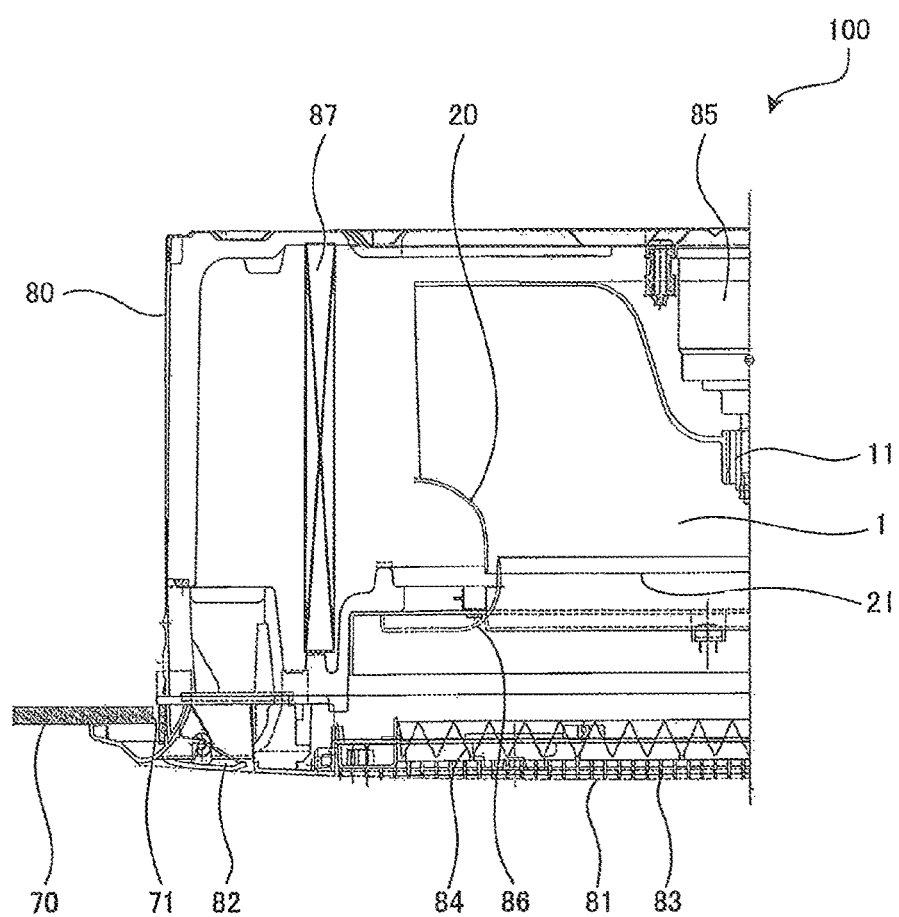
FIG. 11 is a partial cross-sectional view schematically illustrating the configuration of an air-conditioning apparatus according to Embodiment 5 of the present invention.

An air-conditioning apparatus according to Embodiment 5 of the present invention is described below. FIG. 11 is a partial cross-sectional view schematically illustrating the configuration of the air-conditioning apparatus according to the present embodiment. The air-conditioning apparatus according to the present embodiment includes a centrifugal fan according to any one of Embodiments 1 to 4 (for example, the centrifugal fan 1 according to Embodiment 1). In the following description of the present embodiment, a ceiling concealed indoor unit 100 is used as an example of an air-conditioning apparatus. Elements that have the same function and effect as those of the centrifugal fan 1 of Embodiment 1 are represented with the same reference signs for avoiding duplication of description.

As shown in FIG. 11, the ceiling concealed indoor unit 100 is embedded in the back side of a ceiling 70. A lower surface opening of the indoor unit 100 is exposed from an opening 71 of the ceiling 70. A decorative panel 83 having an air inlet 81 and an air outlet 82 is attached to an area covering the lower surface opening of a body outer frame 80 and a peripheral edge of the opening 71 of the ceiling 70. A filter 84 is provided downstream of the air inlet 81.

A fan motor 85 is attached to a top panel of the body outer frame 80. A boss 11 of the centrifugal fan 1 is fixed to an output shaft of the fan motor 85. The centrifugal fan 1 is mounted so that the air inlet 21 of the shroud 20 is positioned on the side of the air inlet 81 of the decorative panel 83. A bell mouth 86 is provided between the air inlet 81 of the decorative panel 83 and the air inlet 21 of the shroud 20. A heat exchanger 87 is provided on a downstream outer circumference of the centrifugal fan 1 in an air flow from the air inlet 81 to the air outlet 82.

When the operation of the air-conditioning apparatus including the ceiling concealed indoor unit 100 having the above described configuration starts, the fan motor 85 is rotatably driven and the centrifugal fan 1 fixed to the output shaft of the fan motor 85 rotates. Due to the rotation of the centrifugal fan 1, air in a room is sucked in from the air inlet 81, purified by the filter 84, flows through the bell mouth 86 into the centrifugal fan 1, and exits through a space between the blades 30 into an outer periphery of the centrifugal fan 1. The air exiting from the centrifugal fan 1 then flows through the heat exchanger 87, is cooled or heated by heat exchange with refrigerant circulating in the heat exchanger 87, and is blown into the room from the air outlet 82 as the conditioned air.

As the air-conditioning apparatus according to the present embodiment includes the centrifugal fan according to any one of Embodiments 1 to 4, an air-conditioning apparatus can be obtained that has high strength and that operates with low noise and small power consumption.

Other Embodiments

The present invention is not limited to the above described embodiments and can be modified in various ways.

For example, although the blade 30 having a three-dimensional blade shape is used as an example in the above embodiments, the blade 30 may have a two-dimensional blade shape.

Also, as an example, although the blade 30 in the above embodiments is welded to both the main plate 10 and the shroud 20, the blade 30 may be welded to either the main plate 10 or the shroud 20.

Also, although, in Embodiment 5 described above, the ceiling concealed indoor unit 100 is used as an example of the air-conditioning apparatus including the centrifugal fan 1, the air-conditioning apparatus including the centrifugal fan 1 may be an indoor unit having a different configuration, an outdoor unit of an air-conditioning apparatus, or an air purifier, for example.

Furthermore, the embodiments or the modifications described above may be combined with one other.

REFERENCE SIGNS LIST 1 centrifugal fan 10 main plate 11 boss 12 concave portion 12a abutted surface 20 shroud 21 air inlet 22 concave portion 22a abutted surface 30 50 60 blade 30a pressure surface 30b suction surface 31 main blade 31a surface portion 31b upper edge portion 31c lower edge portion 32 blade cover 33 hollow space 34 35a 35b abutting surface 36 37a 37b 51 52a projection 40 41 laser beam 70 ceiling 71 opening 80 body outer frame 81 air inlet 82 air outlet 83 decorative panel 84 filter 85 fan motor 86 bell mouth 87 heat exchanger 100 indoor unit

The invention claimed is:

1. A centrifugal fan comprising:
a main plate rotatably driven by a fan motor;
a shroud facing the main plate; and
a plurality of blades provided between the main plate and the shroud, wherein
the centrifugal fan is configured to suck gas in a direction of a rotation axis and blow out the gas in a direction intersecting the rotation axis,
each of the plurality of blades includes an abutting surface that abuts on an abutted surface formed on at least one of the main plate and the shroud, the abutting surface has an edge and a central portion,
the abutting surface includes a projection that extends in a straight line or a curved line, and
the abutting surface and the abutted surface are welded to each other by a laser beam directed onto and moved along the projection,
each of the plurality of blades further includes
a first member constituting at least a part of one blade surface of each of the plurality of blades, and
a second member having a surface portion facing the first member and constituting at least a part of an other blade surface of each of the plurality of blades and a peripheral edge extending from an end of the surface portion toward an end of the first member, the second member forming a hollow space between the first member and the second member,
the abutting surface is formed on the peripheral edge of the second member,
the projection is formed closer to the surface portion of the second member than the central portion of the abutting surface in a direction of extension of the peripheral edge of the second member, and
the projection is formed apart from both the edge of the abutting surface and the central portion of the abutting surface in the direction of extension of the peripheral edge of the second member.

2. The centrifugal fan of claim 1, wherein
a cross-sectional shape of the projection is either triangular, rectangular, or arcuate, and
a width of the projection is between 50% and 150% of a spot diameter of the laser beam.

3. The centrifugal fan of claim 1, wherein
each of the plurality of blades is made of a first resin material,
at least one of the main plate and the shroud on which the abutted surface is formed is made of a second resin material,
an absorbance of the laser beam of the first resin material is higher than an absorbance of the laser beam of the second resin material, and
a transmittance of the laser beam of the second resin material is higher than a transmittance of the laser beam of the first resin material.

4. The centrifugal fan of claim 1, wherein each of the plurality of blades has a three-dimensional blade shape that is twisted between the main plate and the shroud.

5. An air-conditioning apparatus including the centrifugal fan of claim 1.

6. A method of manufacturing a centrifugal fan having a main plate rotatably driven by a fan motor, a shroud facing the main plate, and a plurality of blades provided between the main plate and the shroud, the centrifugal fan being configured to suck gas in a direction of a rotation axis and blow out the gas in a direction intersecting the rotation axis, the method comprising:
forming a projection that extends in a straight line or a curved line on an abutting surface formed on each of the plurality of blades for abutting on an abutted surface formed on at least one of the main plate and the shroud, the abutting surface has an edge and a central portion;
placing the projection formed on the abutting surface in abutment with the abutted surface; and
welding the abutting surface and the abutted surface to each other by directing a laser beam onto the projection and moving the laser beam along the projection, wherein
each of the plurality of blades further includes
a first member constituting at least a part of one blade surface of each of the plurality of blades, and
a second member having a surface portion facing the first member and constituting at least a part of an other blade surface of each of the plurality of blades and a peripheral edge extending from an end of the surface portion toward an end of the first member, the second member forming a hollow space between the first member and the second member,
the abutting surface is formed on the peripheral edge of the second member,
the projection is formed closer to the surface portion of the second member than the central portion of the abutting surface in a direction of extension of the peripheral edge of the second member, and
the projection is formed apart from both the edge of the abutting surface and the central portion of the abutting surface in the direction of extension of the peripheral edge of the second member.

7. The method of manufacturing the centrifugal fan of claim 6, the method further comprising
pressing the main plate and the shroud in mutually facing directions with the plurality of blades positioned therebetween to bring the abutting surfaces and the abutted surfaces into close contact after the welding of the abutting surface and the abutted surface.

8. The centrifugal fan according to claim 1, wherein
the abutting surface is a continuous surface that includes the central portion and the edge of the abutting surface, and the projection is formed on the abutting surface between the edge and the central portion of the abutting surface.

9. The method of manufacturing the centrifugal fan of claim 6, wherein
the abutting surface is a continuous surface that includes the central portion and the edge of the abutting surface, and the projection is formed on the abutting surface between the edge and the central portion of the abutting surface.

\* \* \* \* \*